INVENTOR
Harold A. Jewett.

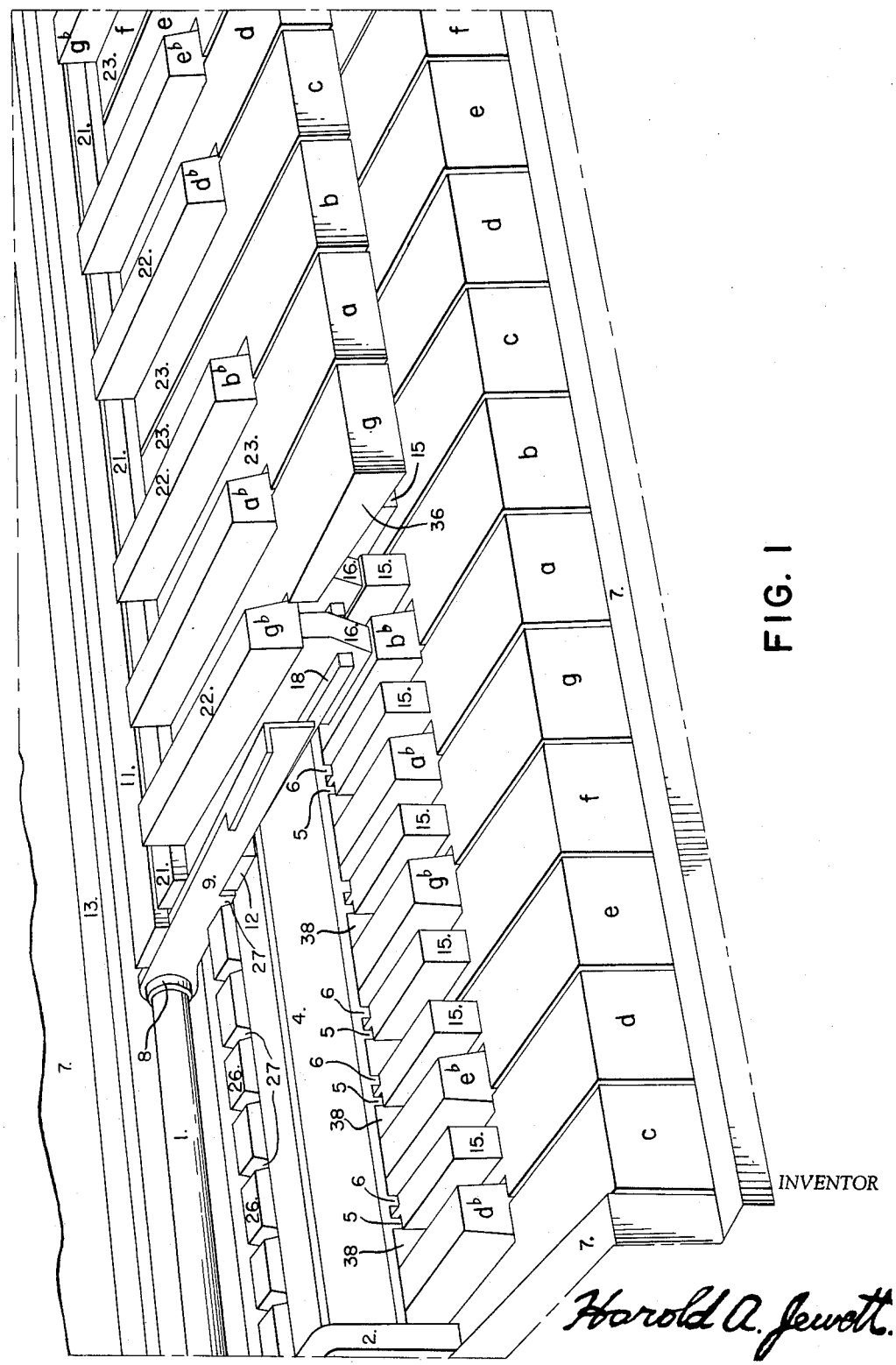

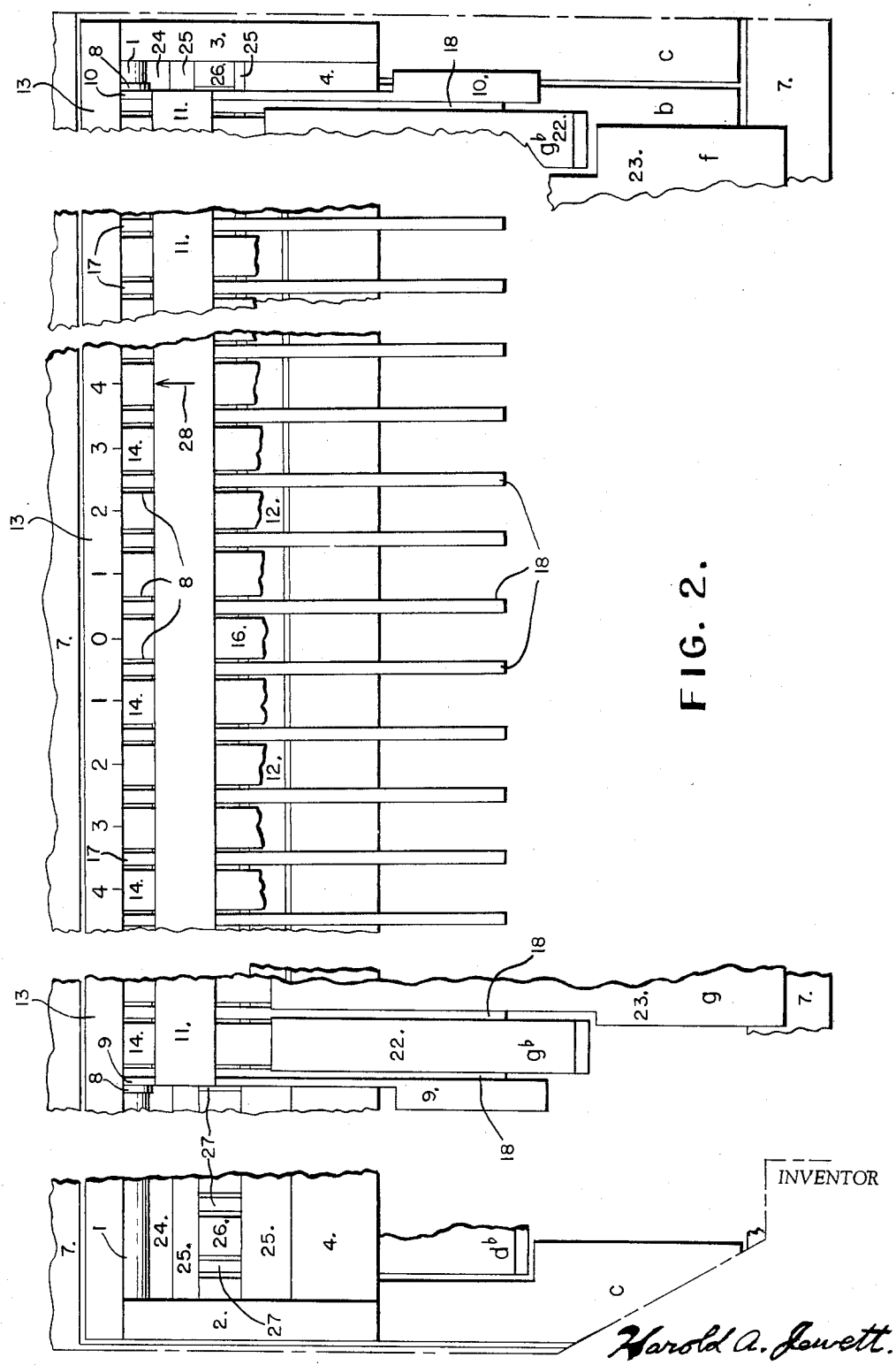

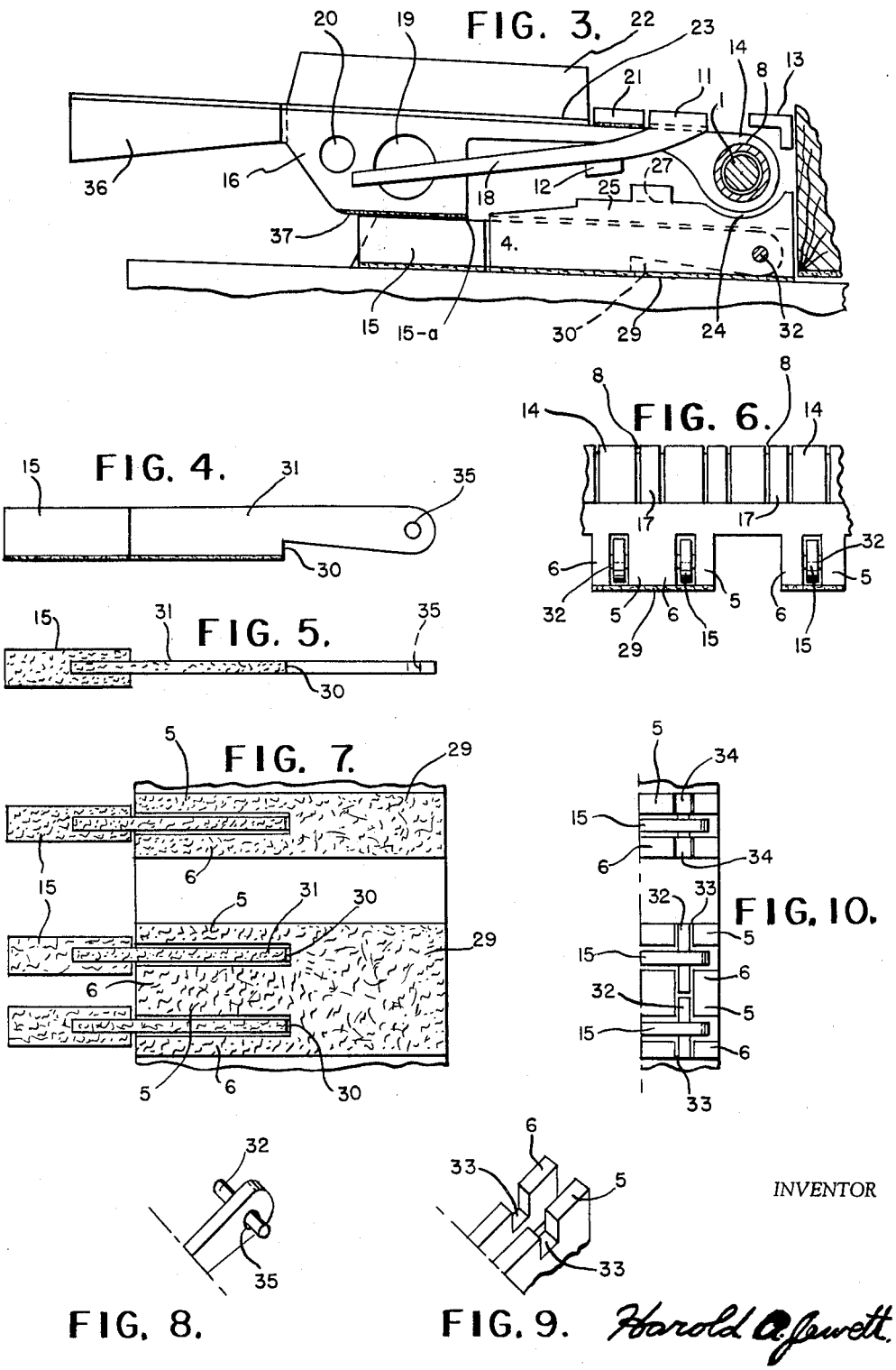

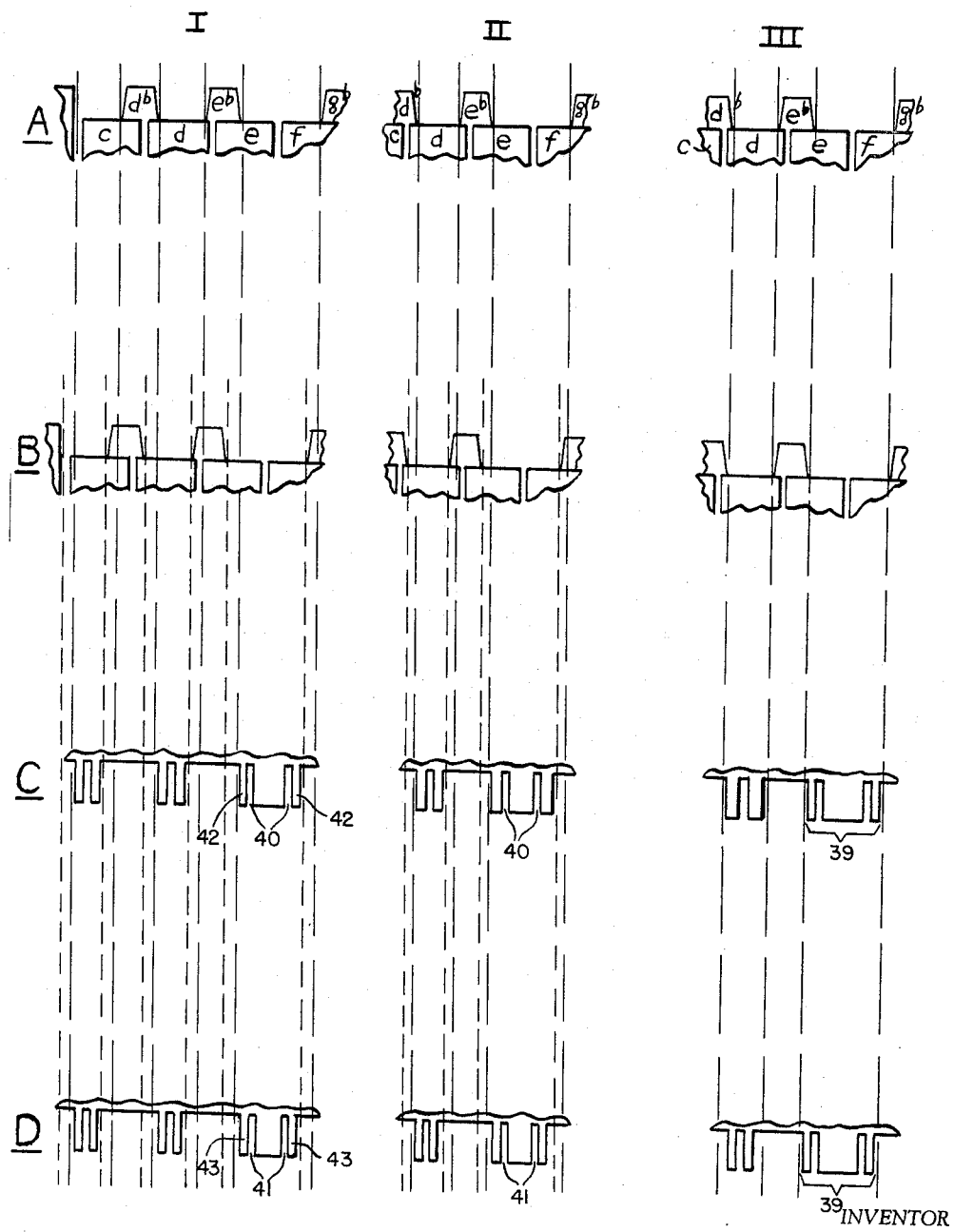

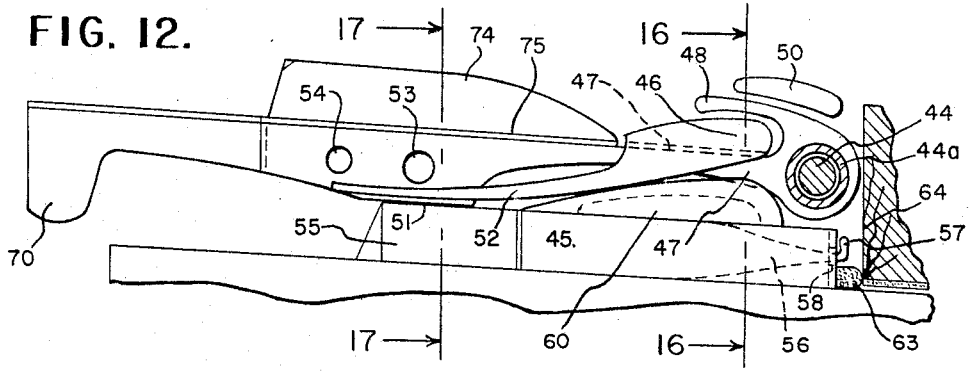
FIG. 12.
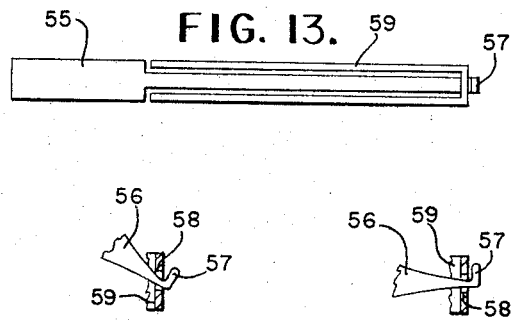
FIG. 13.
FIG. 14. FIG. 15.
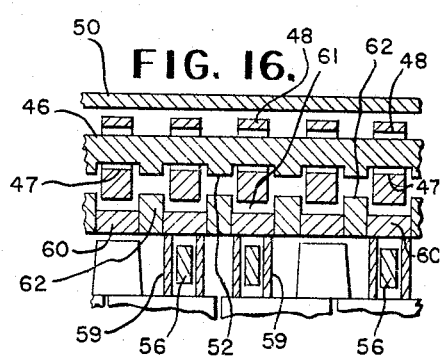
FIG. 16.
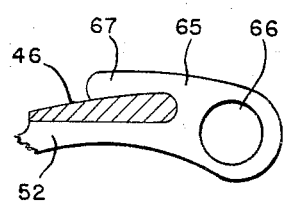
FIG. 18.
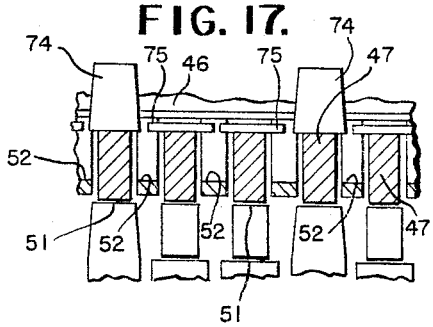
FIG. 17.
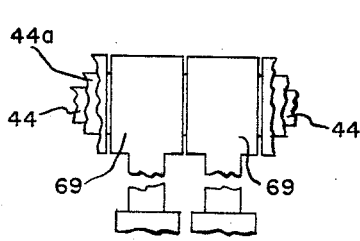
FIG. 19. FIG. 20.
INVENTOR
Harold A. Jewett.

Oct. 5, 1965 H. A. JEWETT 3,209,637
KEYBOARDS AND ACCESSORIES
Filed June 5, 1961 8 Sheets-Sheet 7
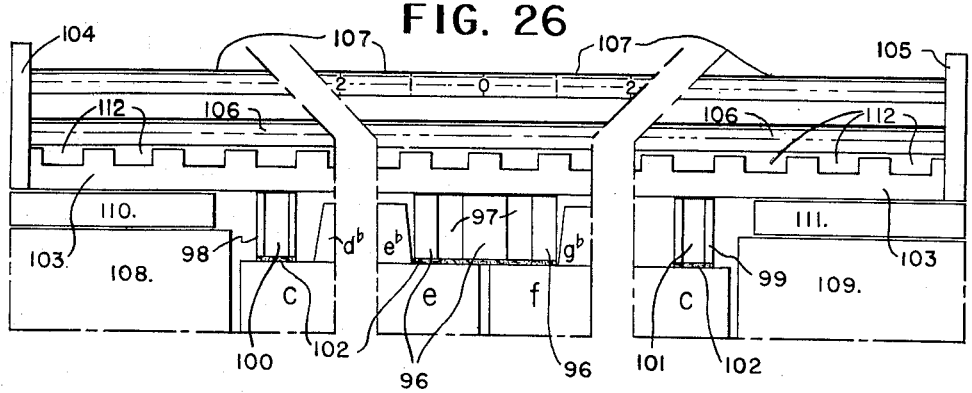
FIG. 26
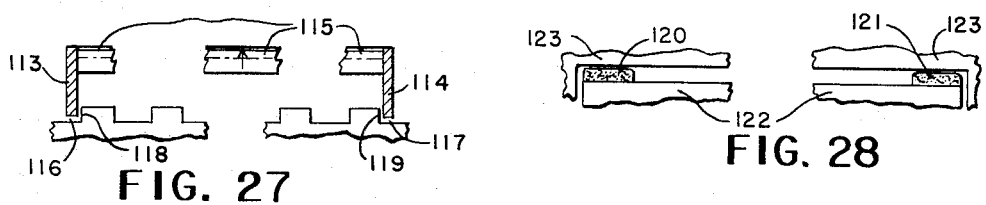
FIG. 27   FIG. 28
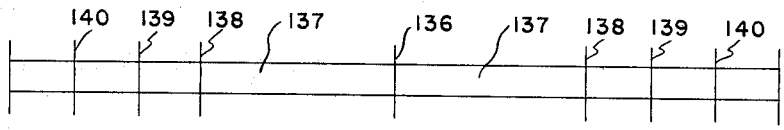
FIG. 30
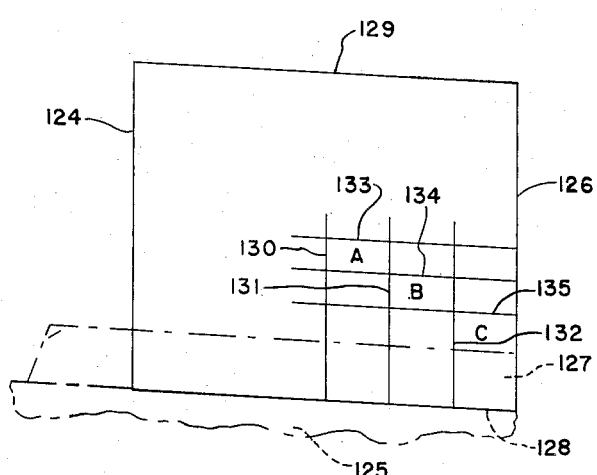
FIG. 29
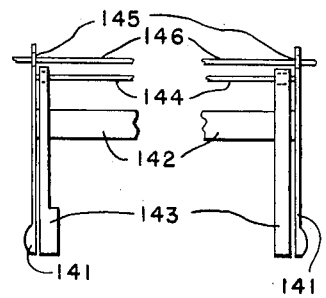
FIG. 31
INVENTOR
Harold A. Jewett.

Oct. 5, 1965   H. A. JEWETT   3,209,637
KEYBOARDS AND ACCESSORIES
Filed June 5, 1961   8 Sheets-Sheet 8
FIG. 32
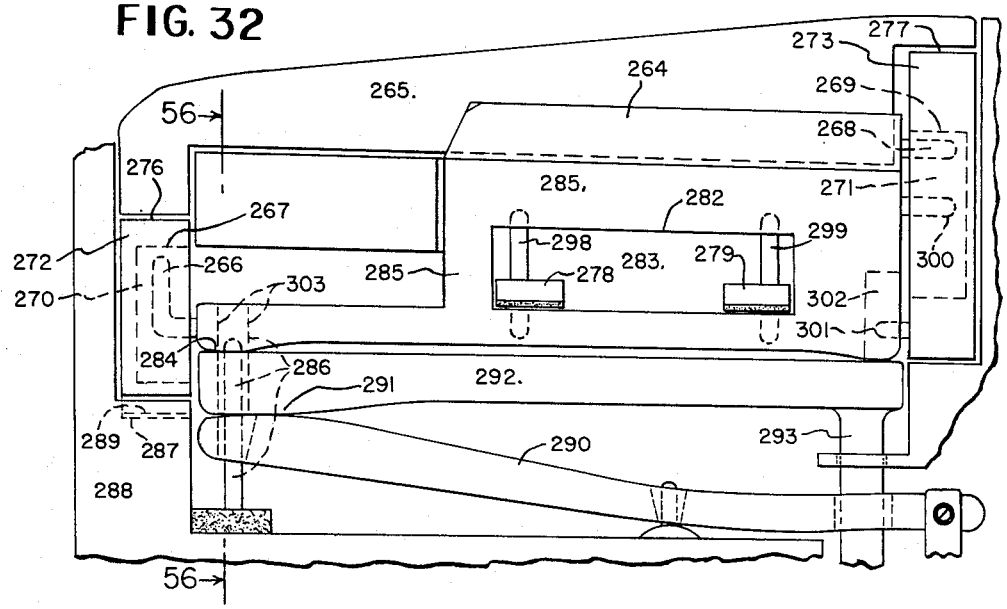
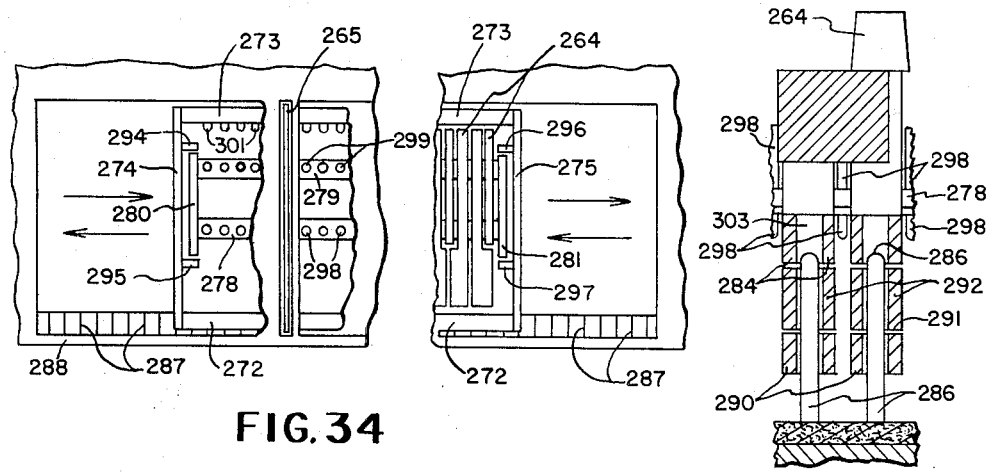
FIG. 34
FIG. 33
INVENTOR
Harold A. Jewett.

3,209,637
KEYBOARDS AND ACCESSORIES
Harold A. Jewett, 5451 42nd St. NW., Washington, D.C.
Filed June 5, 1961, Ser. No. 116,364
24 Claims. (Cl. 84—425)

This application is a continuation-in-part of my copending application Serial No. 585,010, filed May 15, 1956, now Patent No. 2,996,942.

This application contains subject matter which was disclosed to some extent in applicant's applications S.N. 138,424, filed Jan. 13, 1950, and S.N. 307,099, filed Aug. 29, 1952, and the applications on which his U.S. Patents 2,675,728 and 2,675,729 (now Reissue No. 23,956) and 2,996,942 issued; said S.N. 138,424 and 307,099, though now abandoned, having been co-pending with the applications on which his said patents issued.

A number of abbreviations and terms used herein and/or the aforesaid parent applications will have the following meanings:

*tr*—transposing device or keyboard;

$$\frac{oct}{7}$$

1/7 octave length;

$$\frac{oct}{12}$$

1/12 octave length and/or a semitone, depending on the context;

Ivory or ivory cap or top—the upwardly facing finger-contacting surface of a key, whether or not supplied by a lamina;

Equalizer—means for imparting an approximately rectilinear quality to the motion of the ivory of a piano or organ type of key during use;

Levelizer—means for in effect raising the level of the tops of white ivories to that of the tops of adjacent black ivories;

Carrier key—any one of a succession of keys whose upper portions are generally alike and which are, or are provided with, their own equalizer means, and are adapted to carry and impart their equalization to ivory-capped passenger keys riding on them;

Passenger key—any one of a succession of keys which are generally alike (except that some are capped with white ivories and others with black) and are adapted to ride on carrier keys as aforesaid.

Central objects of the invention include the provision of a transposing device for a keyboard type musical type instrument, wherein the rears of ivories of keys of a transpositionally shiftable manual of keys are disposed to descend a considerable distance, e.g. at least about 1/5 as much as the fronts of said ivories, and yet said manual be optionally comprised in an assembly whose rearwardmost shiftable longitudinal frame member extends only a short distance (if any), e.g. not more than about 1/4 of said keys' white-ivory length, rearwardly of the vertical plane which includes the rears of the ivories of said keys; also, the provision of such a device wherein at least the white keys are yieldingly sustained by a stationary series of under levers at points or loci which lie in a common elevation and are included in or intersected by the plane which is parallel to the vertical plane that includes the fronts of the black ivories of said keys and is frontward of that plane a substantial distance, e.g. at least 1/10 the white-ivory length of said keys. Reasons for said fractional designations, and preferred embodiments wherein said 1/5 and 1/10 distances are greater, and said 1/4 distance is less, will be discussed below.

Further objects include provision of novel means for interlocking a shiftable transposer assembly with a stationary assembly complementary to it; also, as stated in parent Reissue No. 23,956 to use the collective hold-up force of host keys not only to sustain auxiliary *tr* keyboards or segments of them but also to sustain upstop and/or downstop members common to the latter's keys.

Still further objects, common both to parent S.N. 585,010 (now U.S. Patent 2,996,942) and this application, include the provision of novel means or novel combinations of means in accordance with the following outline of objects which was set out in the original text of pages 2–3 of said S.N. 585,010.

I.—In regard to portable assemblies of chromatic scale tone actuators generally—

(a) For installation merely by setting the assembly down on or over a host manual, and de-installation merely by lifting the assembly away from such manual, (b) For centering and securing against endward displacement notwithstanding octave length variances among different makes or models of host instruments on which to be used as well as for operability of all parts despite such variances, (c) For stabilizing against frontward or upward displacement without resort to fastening structures, (d) For insuring constancy of shape and dimension (despite atmospheric variations and lapse of time), corrosion resistance, lightness of weight, ruggedness, and general durability.

II.—In regard to portable *tr*'s particularly (besides objects I–*a* to *d* above):

(a) For shifting a bench of *tr* keys to a desired transpositional position by a single, approximately instantaneous manipulation;

(b) For minimizing the distance of the *tr* manual above the host manual;

(c) For minimizing arcing of the *tr* keys and levelizers associated with them, as well as the drop of the *tr* white key fronts;

d) For minimizing rub and wear of key action and guide parts;

(e) For eliminating need for *tr* key return springs.

III.—In regard to in-built *tr*'s (besides objects I–*d* and II–*a*, *d* and *c*):

(a) For minimizing outwardly visible differences from non-*tr* keyboard instruments;

(b) For minimizing front-to-rear overall dimension;

(c) For imparting improved ivory motion to the *tr* keys.

Accomplishment of said objects, as well as additional objects appearing below, is exemplified in the following drawings in respect to which chromatic scale tone producer installations, if not shown, are to be understood as implied; moving and bearing parts as being optionally provided with "anti-stick" or slippery-but-wear-resistant surfacing at bearing or rub points; lever, spring or other moving parts as provided, when needed, with suitable freedom of play and appropriate stop, anti-backlash, damper and/or sound-absorbing means; all figures as being basically grammatic or schematic; and all expressions such as vertical, horizontal, downward, upward, lateral, parallel, longitudinal, etc., as being relative and approximate unless otherwise evident, to be more particularly described later on.

FIG. 1 is a perspective of a bass-end portion of a portable *tr* of the invention in position of use on a host keyboard;

FIG. 2 is a plan of the *tr* and host keyboard of FIG. 1 but with certain parts omitted;

FIG. 3 is an end elevation of the *tr* and host keyboard of FIG. 1 but with *tr* frame ends omitted;

FIG. 4 is a side elevation of one of the levelizers appearing in FIGS. 1 and 3;

FIG. 5 is a bottom view of the levelizer of FIG. 4;

FIG. 6 is a rear elevation, slightly varied and with certain parts omitted, of a portion of the *tr* of FIGS. 1–3;

FIG. 7 is a bottom view of said portion;

FIG. 8 is a bottom view, in perspective, of the rear part of the levelizer of FIG. 4;

FIG. 9 is a bottom view, in perspective, of levelizer pivot structure adapted to receive said rear part;

FIG. 10 is a bottom view, with certain parts omitted, of the structure of FIGS. 6 and 7;

FIG. 11 is a front elevational diagram of successions of ivories of a pair of host keyboards, one of which has a relatively short octave length and the other of which has a relatively long octave length, and of motionless-in-use partition structures associated therewith and adapted to serve both as centering and support agencies on either of said host keyboards;

FIG. 12 is the same as FIG. 3 except for differences pointed out below;

FIG. 13 is a plan of one of the levelizers of FIG. 12 and the guide structure in which it is pivoted;

FIG. 14 is a side elevation detail of the levelizer of FIG. 13 during assembly into its position of use;

FIG. 15 is the same as FIG. 14 except after completion of said assembly;

FIG. 16 is a section on line 16—16 of FIG. 12;

FIG. 17 is a section on line 17—17 of FIG. 12;

FIG. 18 is a side elevational detail of a form of rear key-to-key spacer useful in the *tr* of FIG. 12;

FIG. 19 is a side elevational detail of an alternative form of such spacer;

FIG. 20 is a plan detail of successive keys so proportioned as to obviate need for auxiliary rear spacers;

FIG. 26 is a front elevation of the non-shiftable frame portions of a *tr* which derives its primary support from host end blocks but is centered in accordance with principles discussed below in connection with FIG. 11;

FIG. 27 is a fragmentary front elevation, partly in section, of the shiftable frame ends' locking means as contemplated for the *tr* of FIGS. 12–24;

FIG. 28 is a fragmentary plan of a host whose casing is contacted solely by small cushions affixed to end loci of non-shiftable frame structure of a portable assembly;

FIG. 29 is an end elevational diagram to be referred to below in connection with preferred zones for locating the center of gravity of portable assemblies;

FIG. 30 is a plan diagram of a *tr* keys' upstop or stoprail bar intended to rest on and be supported by the *tr* keys;

FIG. 31 is a fragmentary plan of a non-preferred form of the lift-shift-lock structure variously exemplified in the *tr*'s of FIGS. 1–10, 12–24;

FIG. 32 is an end elevation, with certain end parts omitted, of an in-built embodiment of the invention wherein the *tr* keys are carried by cane-type equalizers;

FIG. 33 is a section on line 33—33 of FIG. 32;

FIG. 34 is a plan diagram of the *tr* of FIG. 32, with certain parts omitted.

Figure 21:
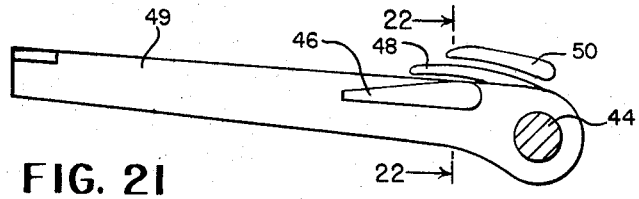
FIG. 21 is an end elevation of the *tr* of FIG. 12 but with frame ends added and host keyboard omitted.
Figure 22:
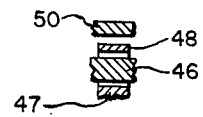
FIG. 22 is a fragmentary section on line 22—22 of FIG. 21.

U.S. Patent 2,996,942, which issued on Serial No. 585,010, filed May 15, 1956, was directed mainly to FIGS. 1–10 subject matter, but the descriptive text relating to those figures is repeated below in view of its relevance to the subject matter of the claims generally and the fact that the scheme of describing some of the later figures herein involves pointing out the differences and analogies between such later figures, on the one hand, and said FIGS. 1–10, on the other.

Referring to the drawings in detail:

In FIGS. 1–10 round pivot rod 1 is fixed in end pieces 2 and 3 of non-shifting frame 4 whose downwardly extending partitions 5 and 6, along with said end pieces 2 and 3, seat on and are sustained by the collective hold-up force of white ivories (lettered but unnumbered) of host instrument 7. Otherwise, all portions of frame 4 clearingly overlie the host black ivories (lettered but unnumbered). Slidably sleeved on rod 1 is pivot tube 8 and united to the latter are end arms 9 and 10. Rigidly interconnecting said arms are lock bar 11 and lifter bar 12; said tube 8, bars 11 and 12, and arms 9 and 10 constituting a liftable and shiftable frame, and said arms constituting lock portions thereof, as will presently be explained. Angle bar 13, rigidly interconnecting end pieces 2 and 3, overlies *tr* key rears 14 (all of which are alike) and carries the centrally located *tr* index appearing on FIG. 2. Levelizers 15, pivoted between rear portions of partitions 5 and 6 (such partitions being shown in FIG. 6–7 and 10 as optionally integral with each other in those instances where they overlie host white key-to-white key seams) are 7/16 inch in height and thus bring the effective level of the host whites up to that of the host blacks. Rearward of the *tr* white key fronts, *tr* key bodies 16 are all alike and each rests on either a host black ivory or a levelizer, all at a common elevation, as at 15–a (FIG. 3). It will be noted that both lock bar 11 and lifter bar 12 are above said common elevation.

$$\frac{oct}{12}$$

center-to-centering of *tr* key rears 14 is maintained by rear spacers 17 which encircle pivot tube 8; while similar center-to-centering of frontward portions of *tr* key bodies 16 is maintained by spacer fingers 18 which are integral with and extend frontwardly from lock bar 11, at a sufficiently downward angle to be out of the way of a player's finger tips at all times. Optionally, rear spacers 17 and spacer fingers 18 can be united. Holes 19 and 20 (shown only in FIG. 3) serve to lessen the weight of *tr* key bodies 16. *Tr* keys' stop rail 21 rests on *tr* key bodies 16 just rearward of their ivory caps 22 and 23, and is collectively supported by them.

Low fulcrumming of the *tr* keys via low placement of rod 1 and tube 8 is facilitated by valley 24 in frame 4. Relatively thick portion 25 of frame 4 serves to impart strength and to carry furrows blocks 26 which define furrows 27. The latter occur at $$\frac{oct}{12}$$

intervals and are adapted to receive *tr* frame end arms 9 and 10 in the manner illustrated in the case of end arm 9 in FIG. 1, the furrows 27 thus serving as complementary lock structures on the non-shifting frame, for cooperation with the lock structures (arms 9 and 10) on the shiftable frame. *Tr* arrow 28 (FIG. 2) is so placed that whenever it points directly to a *tr* index mark each of the end arms 9 and 10 will directly overlie a furrow 27.

Felt stripping 29 (FIGS. 3, 6 and 7) serves not only to deaden sound but also to limit rotatory movement of the levelizers during handling of the *tr*. Cut-away portions 30 in the shanks 31 of the levelizers suffice, however, to permit the slight rotatory movement of the shanks which occurs during use.

Where frame 4 is cut from a single piece of material (e.g. wood) fulcrumming of levelizer pivots 32 (FIG. 8) can conveniently be accomplished by cutting cross channels 33 in partitions 5 and 6 (FIG. 9) and then placing said pivots 32 in them. The situation will then be as shown in the case of the two lowest levelizers in FIG. 10; following which, filler blocks 34 can be secured in the channels 33 to hold the pivots 32 in place, as shown in the case of the highest levelizer in FIG. 10. Reciprocation of the levelizers about their pivots 32 occurs at the eyes 35 of the levelizers (FIGS. 4 and 8).

The downward sloping of the under surface of white *tr* key fronts 36 (FIGS. 1 and 3) is not only for purposes of appearance but also to provide finger guard surfaces. On the other hand, minimizing of *tr* key weight is desirable; hence, the upward sloping of said under surface toward the rear.

Proportioning of the parts of the *tr* keys (best seen in FIG. 3) is determined with a view to operability not only on hosts of variant octave length but also of variant black ivory length. This accounts e.g. for the more than ½ (approximately 1⅛) inch length of downpusher surface 37 shown on FIG. 3.

It is believed that the manner of use of the *tr* of FIGS. 1–10 and the functioning of its parts will be clear from the foregoing description.

Briefly summarized, however, such use involves lifting the *tr* from its carrying case (not shown) wherein appropriately placed partitions and wall surfaces can guard the *tr* and its moving parts during transportation; placement of the *tr* on a host keyboard with the end pieces 2 and 3 resting on *c* ivories whose distance apart approximates that separating said end pieces; lifting of said shiftable frame, e.g. by grasping one or both of the end arms 9 and 10 (e.g. until *tr* ivory rears 14 contact angle bar 13); sliding of pivot tube 8 along pivot rod 1 until the *tr* arrow 28 points to the index mark corresponding to the degree of transposition desired; and lowering of said shiftable frame so that the end arms 9 and 10 will seat in the particular furrows that will then respectively underlie them. In the situation illustrated in FIGS. 1–2 e.g. that will result in $$\frac{4 \text{ octs}}{12}$$

transpostion upward, as indicated by the fact that the terminal *g*-flat *tr* keys in the figures are resting on host *b*-flat keys.

Should the user wish to effect the transpositional adjustment single-handedly, he need grasp only one end arm or only one of the *tr* keys. In the latter case, as the *tr* key is raised ( cf. e.g. FIG. 50 and text descriptive thereof) it liftingly engages the under surface of the lock bar, thereby raising the latter; after which the shift-lock manipulation is the same via the *tr* key as if done via the end arms.

Centering of the *tr* will have been effected by a loose but close fit between the partitions 5 and 6 occupying the space between central *e*-flat and *g*-flat host keys and the juxtaposed walls of said keys, with substantial spacing between such partitions and corresponding host black key walls at outlying loci. Such substantial spacing is exemplified by relatively wide spaces 38 on FIG. 1, and provides for operability on hosts of variant octave lengths.

In FIG. 11, which is addressed to the matter of centering, portion A–I is a front elevational reduced scale diagram of a bass-end succession of ivories of an ordinary 61-note manual having, let us assume, the shortest octave length of any make of host instrument under contemplation; A–II is the same except that its succession of ivories is an octave nearer the center of the manual than that of A–I; and A–III again is the same, except that in it the succession of ivories is at the middle of the manual. B–I, B–II and B–III are respectively identical with A–I, A–II and A–III, except that their ivories belong to a manual having the longest octave length of any make of host instrument under contemplation. Said octave lengths thus represent the extremes against which provision is to be made, in determining the placement of partitions corresponding to 5 and 6 of, say, FIG. 6. The long dash lines on FIG. 11 are dropped perpendicularly from the side wall bottoms of the black ivory caps in row A, and the short dash lines from those in row B (none of the latter lines appearing in column III, however, since its ivories are central and their black key-to-black key spaces consequently are substantially equal).

Now, centering of a portable keyboard on either of the manuals of FIG. 11 can be effected exclusively by partition structure 39 (C–III and D–III) whose overall width is such as to fit snugly but freely between middle *e*-flat and middle *g*-flat on either manual A or manual B. It might have been thought that the usual amount of lateral play of piano and organ key levers in relation to their guide pins would operate to make such centering inadequate, but this has not been found to be so. In other words, even though a slight endward displacement of one of the portable assemblies of the invention can be produced by exertion of an endward force against it, on account of said lateral play, no inoperativeness has been found to result therefrom, when outlying partition structures occupying black key-to-black key spaces have been made sufficiently narrow, and levelizers pivoted in them spaced an ample distance from *e–f* or *b–c* seams underlying such structures, to avoid unwanted overlap of such levelizers onto adjacent such *e* or *f*, or *b* or *c* ivories.

To determine the requisite narrowness in this regard, it is only necessary to make sure that none of the partition structures in question is wide enough to be intersected by any of the FIG. 11 dash lines, whether long or short. Row C on FIG. 11 shows such structures which, while meeting this test, are of gradually diminishing width outwardly from the center (C–III). This makes possible a maximum of width at any particular locus, and may be a preferred expedient when a frame such as 4 of FIG. 1 is cut from wood or analogous material. In contrast, row D on FIG. 11 shows such structures where all except the centering one itself (39 in D–III) are of uniform width. This type may be preferred where the structures are fabricated separately and then affixed to the frames.

To insure against the aforesaid overlap of levelizers onto neighboring ivories, notwithstanding the cumulative effect of octave length variances among hosts outwardly along the manual, the levelizer channels 40 in row C and 41 in row D can be spaced apart as far as possible, consistently with adequate width or strength of walls 42 (row C) and 43 (row D). And in any case, taking into account the aforesaid lateral play of key levers in relation to their guide pins, as well as the slight lateral play which will inherently occur between the levelizers and the walls of their channels, it is advisable to provide at least ⅛" (better ⁵⁄₃₂" and still better ³⁄₁₆" or more) space between successive levelizers in outlying loci along their frame. Or, put in terms of the width of a levelizer, it may be said that the space between levelizers in terminal octaves (cf. e.g. the levelizers 15 resting on low *e* and low *f* in FIG. 1) advantageously can be at least ⅓ (better ½, and still better ⅔) the levelizer width.

In determining the octave length to adopt in constructing any of the portable assemblies of the invention, one midway between that represented in a row A and that represented in row B of FIG. 11 can be selected, and all $$\frac{oct}{12}$$

center-to-centering in the construction of such assemblies be on the basis of it.

Figure 23:
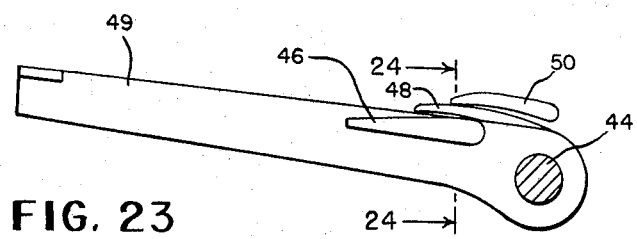
FIG. 23 is the same as FIG. 21 except that the frame ends have been swung upward, as by lifting at their fronts, preparatory to shifting of the frame to a desired transpositional position.
Figure 24:
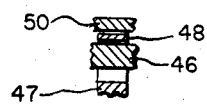
FIG. 24 is a fragmentary section on line 24—24 of FIG. 23 and is the same as FIG. 22 except after said lifting.

The *tr* of FIGS. 12–24 will be most readily understood, it is believed, by first comparing its parts with those of the *tr* of FIGS. 1–10. Thus, pivot rod 44 is like 1 though at a lower level; pivot tube 44a is like 8; non-shifting frame 45 corresponds generally to 4; and shiftable frame bar 46 serves the purposes not only of lock bar 11 but also of keys lifter bar 12 and stop rail 21; the latter, since it is sustained by the collective hold-up force of *tr* key bodies 47 and functions as a *tr* keys' lifter bar by engaging *tr* key hooks 48 when *tr* frame treble end arm 49 (FIGS. 21 and 23) and a corresponding bass end arm (understood) to which the ends of bar 46 are united, are raised; the positions of the parts before and after such raising respectively depicted in FIGS. 21–22 and FIGS. 23–24. As best seen in FIGS. 12 and 16, the *tr* key hooks 48 overlie bar 46 a sufficient distance not to impinge on it during down travel of the *tr* keys with which they respectively are integral, and underlie index bar 50 (corresponding to 13) a sufficient distance to insure adequate elevation of the *tr* key downpusher surfaces 51 (similar to 37) when, upon raising of said end arms, the series of *tr* keys is shifted to a desired transpositional position. Spacer fingers 52, being integral with bar 46, correspond to 18. Holes 53 and 54 (FIG. 12) are analogous to 19 and 20.

Levelizers 55 (corresponding to 15) have rear portions 56 terminating in tails 57 adapted to be fed freely through pivot eyes 58 in levelizer channel pieces 59 in manner apparent from FIG. 14, so that in position of use (FIGS. 15 and 12) the levelizers will be locked in place by said tails, yet have ample freedom for reciprocation. It will be noted that the upper portions of the rear ends of channel pieces 59 present rearwardly facing surfaces which are disposed for being slidably engaged by the frontwardly facing surfaces of tails 57 during use; the movement of said frontwardly facing surfaces being downward in response to down motion of *tr* keys respectively overlying the levelizers, and said upper portions serving as motionless-in-use anchor means for preventing frontward displacement of the levelizers during their said downward movement.

Longitudinal tie member 60, interconnecting channel pieces 59, has relatively wide and deep furrows 61 whose walls 62 are engaged by the *tr* frame end arms when the latter are lowered after shifting of the bench of *tr* keys until the *tr* arrow (assumed to be on the upper face of keys lifter bar 46) points to a desired *tr* index mark. Said end arms do not seat in the bottoms of the furrows however (as do 9 and 10 in furrows 27), but only reach part way down. This is because collectively upheld bar 46, to which the instant end arms are united, sustains them, rather than vice versa (as in the *tr* of FIGS. 1–10).

During the aforesaid shifting, *tr* key bodies 47 are at a level high enough to clear walls 62, but in position of use they are not. In other words, on lowering of the *tr* frame end arms, said key bodies (which optionally could be bevelled, or else the tops of said walls be bevelled, to facilitate feeding of the bodies into the spaces between the walls) occupy positions best seen in FIG. 16. And during down travel of the *tr* keys in use, said walls consequently serve as guides or stabilization aids for them.

Treble end cushion 63 (FIG. 12) and an analogous one (understood) at the bass end of frame 45, serve to protect host casing 64 from contact with the *tr*.

Rear spacers such as 17 can be used for maintaining $$\frac{oct}{12}$$

center-to-centering of the *tr* keys along pivot tube 44a. Alternative structures for this purpose are shown in FIGS. 18–20 however.

Spacer 65 of FIG. 18 is integral with spacer finger 52 and is in union with keys lifter bar 46. Also, it has an eye 66 for encircling pivot tube 44a. By giving spacers 65 substantial vertical dimension (and adapting neighboring parts accordingly) their co-action with walls 62 as *tr* key stabilization aids will be enhanced.

Spacer 68 of FIG. 19 is merely an ordinary resilient split ring or snap washer adapted to be forced directly into place on structure such as tube 44a.

Spacers 69 of FIG. 20 are rear portions of the *tr* key bodies, each being given a width of almost an $$\frac{oct}{12}$$

so as to eliminate need for separate or auxiliary spacers along the tube.

Front portions 70 of the white *tr* keys derive their contour not only from considerations already mentioned in regard to white *tr* key fronts 36 of the *tr* of FIGS. 1–10, but also from the need for operability on host manuals of variant white ivory lengths, e.g. to insure against impingement on fronts of host white ivories of over-average length, during down motion.

Figure 25:
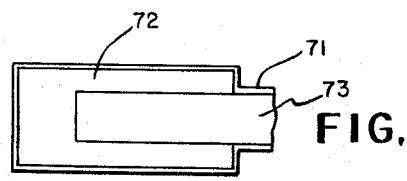
FIG. 25 is a bottom view detail of the front portion of a white key of the *tr* of FIGS. 1–3, but depicts principles of construction useful in other forms of *tr*'s, e.g. that of FIG. 12.

Lightness of weight of the *tr* keys, especially their frontward portions, can be achieved in a number of ways. E.g. the keys can be made hollow, or their bulk can largely be comprised of balsa wood or equivalent material. Thus, in FIG. 25 *tr* ivory cap 71 is affixed to a body 72 of balsa wood which is carried by a shank 73 of plywood. Rigidity and strength is imparted by both the ivory cap and the plywood.

It will be understood that whereas the center-to-centering of the bodies of the *tr* keys of the invention is uniformly at $$\frac{oct}{12}$$

intervals, the placement of their ivory caps is dictated by the geometry of the upper face of the conventional manual. This means that the ivory caps will protrude in varying degrees beyond the key bodies on which they are affixed. For this reason, structures directly beneath such caps must not be less than the ivory drop's distance below them. This is exemplified in the case of spacer fingers 52 (cf. e.g. FIG. 17) whose distance below *tr* ivory caps 74 and 75 has thus been gauged. (Cf. also the height of *tr* ivory caps 22 and 23 above spacer fingers 18 in FIG. 3.)

It is to be noted in regard to FIG. 17, that for clarity section lines have been omitted from all structures except the *tr* key bodies 47 and the spacer fingers 52.

In FIG. 26 centering structure 96, corresponding to 39 of FIG. 11, is slotted to provide channels 97 for levelizers (not shown), while outlying partitions 98 and 99, respectively slotted to provide levelizer channels 100 and 101, are dimensioned and disposed in accordance with the principles discussed in connection with FIG. 11.

Felt stripping 102 corresponds to 29 (FIGS. 3, 6 and 7).

Non-shiftable frame structure 103 (to which centering structure 96 and partitions 98 and 99 are rigidly united and which itself is rigidly united to end pieces 104 and 105, the latter being interconnected by rod 106 and index bar 107) overhangs host end blocks 108 and 109, and receives support from the latter via shims 110 and 111. Such support is supplementary to that imparted by host white ivories (lettered but unnumbered) to parts 96, 98 and 99. If the latter did not reach down sufficiently for felt stripping 102 to contact said ivories however, the support from the end blocks could be the sole support of frame 103 and any shiftable assembly carried by it, without sacrifice of the function of partition structure 96 as a centering agency. On this score it may be observed too, that the same would be true if the centering were effected by a thin spacer depending into the space between rearward portions of a white key and a key adjacent to it.

Furrows 112 correspond to 27, 61 and 90 (more particularly 61 because of their width) but, like rod 106 and index bar 107 which respectively correspond to 1 and 13, 44 and 50, are called into play only in co-action with a shiftable *tr* assembly (not shown in FIG. 26) such as previously described.

In FIG. 27 end arms 113 and 114 (similar to 49 of FIGS. 21 and 23), interconnected by *tr* arrow bar 115 (corresponding to keys lifter bar 46 of said figures), are shown in position of rest. Their failure to reach bottom in furrows 116 and 117 is due to the fact that bar 115 is sustained at too high a level by the *tr* key bodies (understood) on which it rests. Yet the locking function of the arms is served by their engagement, while thus at rest, with walls 118 and 119 of said furrows.

In FIG. 28 cushions 120 and 121 (similar to 63 and 92) are affixed to non-shiftable frame 122 to protect host casing 123 from contact with other portions of 122 or any assembly comprising it.

In FIG. 29 line 124 represents the vertical plane, parallel to the axis of host manual 125, which includes the frontmost portion of any frame structure comprises in a portable assembly having a chromatic scale series of tone actuators, where said assembly is sustained via loose contact with upper surfaces of host ivories or end blocks; line 126 represents the vertical plane, also parallel to said axis, which includes the rears of the host black ivories 127 at the level of the adjacent portions of the upper surfaces 128 of the host white ivories; and line 129 represents the plane which is parallel to said upper surfaces 128 and includes the topmost portion of any frame structure comprised in said portable assembly. Lines 130, 131 and 132 represent planes parallel to 124 and 126, and lines 133, 134 and 135 planes parallel to 128 and 129.

Upward displacement of a portable assembly, due e.g. to prolonged pressure on the front of one of its white ivories, can be adequately countered by giving the assembly sufficient weight (say, at least 1½, better 1¾, 2 or even more ounces per each host white ivory which it overlies) and locating its center of gravity sufficiently rearwardly and downwardly, as presently to be particularized. And frontward displacement in general can be adequately countered too, by giving sufficient length (e.g. four or more times its octave length) to the framework of the assembly.

In respect to the countering of upward displacement it should be added that deformation-resistant longitudinal structure such as angle bar 13 of FIG. 3, closely overlying the rears of *tr* keys fulcrummed as on pivot tube 8 thereof, restricts to a negligible degree any tendency toward upward bowing in use, of a pivot rod such as 1 in said figure. Also, fabrication of such parts as said bar, tube and rod, particularly the latter, of heavy material—e.g. at least partly of one of the metals known as "heavy metals" (specific gravity greater than four)—helps serve this purpose, besides contributing to general stability.

Turning to FIG. 29, and assuming that at least a portion of frame structure of any chromatic scale portable assembly placed on its manual 125 seats on host structure directly underlying the line which is parallel to the axis of the manual and includes the center of gravity of the assembly, line 130 is midway between lines 124 and 126, lines 131 and 132 are equidistant from each other and from 130 and 126 respectively, line 133 is midway between line 129 and surfaces 128, and lines 134 and 135 respectively $\frac{1}{10}$ and $\frac{2}{10}$ the length of 124 or 126 (they being equal) below 133.

Advantageously the center of gravity of the portable assembly will be rearward of line 130, better line 131 or still better line 132. And it also will underlie line 133, better line 134 or still better line 135. Moreover, it advantageously can be within parallelogram A, better parallelogram B or still better parallelogram C.

Weighting or weight distribution can be aided by embedding lead or the like in rearwardly and downwardly located structure such as partitions 5 and 6 of the *tr* of FIGS. 1–10, or rears 14 of the *tr* keys thereof, or rear spacers 17 adjacent said rears.

It may be added, in regard to locating the center of gravity rearward of lines 130, 131 or 132, that where the support of the assembly is derived from collective up-force of host keys, said up-force becomes greater in amount as the distance from the fulcrums of the keys lessens, thus permitting a greater overall weight for the assembly with consequent enhancement of its stability.

It will be borne in mind, of course, that the loci and lengths of the numbered lines on FIG. 29 may vary considerably, depending on the dimensions and proportions of the particular assemblies. E.g. line 129 might be shorter than line 124, and parallelograms A, B and C of less width than height. Not so, however, where the assemblies comprise chromatic scale series of *tr* ivories for operating host keys and thus involve the generation and withstanding of innumerable leverage forces not encountered in other types of the portable assemblies.

In FIG. 30 line 136 denotes the location of the center of gravity of upstop bar 137 which, like rail 21 of FIGS. 1 and 3 or bar 46 of FIGS. 12, 16 and 21–24, not only serves as a stop rail for *tr* keys but is sustained by them. In the case of a *tr* key located at 136 the full weight of bar 137 acts to oppose excessive up-travel of the key during its return motion. But in the case of *tr* keys located endwardly along the bar a progressively smaller fraction of such weight thus acts. Consequently it is advantageous to load the bar with extra weight in its outlying portions. This may be visualized in relation to lines 138 which respectively bisect the left and right halves of bar 136, and lines 139 and 140 which trisect the respective terminal quarters of the bar. I.e., it is advantageous to locate the center of gravity of each half of the bar 136 endwardly of lines 138, better 139, and still better 140; e.g. by giving end arms such as 49 in FIGS. 21, 23 appropriate weight.

In FIG. 31 analogous end arms 141 (which similarly can be given suitable weight) are in union with bar 142 which serves as a stop rail for *tr* keys 143; the latter being fulcrummed on rod 144 which is united to the arms to form with them and bar 142, a rigid rectangular rack. Eyes 145 in the rear ends of arms 141 encircle fixed rod 146 so as to be slidable along it. The unitary lift-shift-lock manipulation of the invention can therefore be effected by slightly raising arms 141 (if desired, by manipulating only one of them), sliding the rack along rod 146, and setting the arms down in selected transpositional position.

One reason why the structure of FIG. 31 is a nonpreferred embodiment of the invention is that its *tr* keys are fulcrummed needlessly forward of rod 146, as contrasted with the situation in FIG. 12 e.g. where the functions of rod 144 and eyes 145 are combinedly served by pivot tube 44a which is sleeved onto pivot rod 44 (the FIG. 12 analogue of rod 146).

In FIGS. 32–34 the lifting of any two symmetrically located *tr* black keys 264 will serve to raise bass-end housing gate 265 and a corresponding treble-end one (not shown) via lifting contact between their front $\frac{oct}{12}$ spacers 266 and ceilings 267, and their rear $$\frac{oct}{12}$$

spacers 268 and ceilings 269 (said ceilings being those of the vertical $$\frac{oct}{12}$$

guide sleeves 270 and 271, within which said spacers 266 and 268 respectively reciprocate during use; which sleeves are comprised in *tr* frame front member 272 and *tr* frame rear member 273). That is, since said gates normally rest on said members 272 and 273 (the same being rigidly united by *tr* frame end members 274 and 275) as at 276 and 277, the upward movement of members 272 and 273 caused by said lifting will serve to raise the gates. And continued raising of the lifter keys will then cause upstop bars 278 and 279 (rigidly united by bass end piece 280 and treble end piece 281) to liftingly engage the tops 282 of windows 283; whereupon the shifting can be done through the thus opened gates, and with front downpusher portions 284 of the *tr* key bodies 285 (all of which bodies are alike except for their ivories and the fronts of their whites) raised clear of $$\frac{oct}{12}$$

guide pins 286, and frame member 272 raised clear of $$\frac{oct}{12}$$

furrows 287 in casing 288, in which furrows $$\frac{oct}{12}$$

locking cogs 289 on the under side of member 272 normally seat.

Non-shifting under levers 290 are schematic for any key levers or other yieldable tone actuators disposed to receive down motion of downpusher portions 291 of "handles" 292 of cane-type equalizers 293 (such as exemplified in FIG. 6 of '728) on which *tr* keys' downpusher portions 284 rest. In fact said equalizers could be omitted entirely if, e.g. under levers 290 were piano or organ key levers of customary length and so modified that the portions of them underlying *tr* key bodies 285 were all identical. In such case however, the rear walls of windows 283 would need to slant rearwardly a little, to allow for arcing during use.

Guide walls 294, 295, 296 and 297 (FIG. 34) function to confine end pieces 280 and 281 and consequently prevent axial displacement of the *tr* keys.

Since the *tr* keys are "passenger keys" stabilization not only at frontward and rearward but also at upper and lower loci is provided. Thus, in addition to the stabilizer action of spacers 266 and 268 already identified, stabilization is contributed by $$\frac{oct}{12}$$

spacers 298 and 299, respectively integral with bars 278 and 279; spacers 300 integral with the *tr* white key rears and vertically reciprocating during use in those of the guide sleeves 271 which are not occupied by spacers 268; and spacers 301 projecting forwardly from *tr* rear frame member 273 and about which guide sleeves 302 in *tr* key bodies 285 vertically reciprocate during use.

Guide pins 286 also contribute stabilization to the *tr* keys via guide sleeves 303 of the latter which reciprocate along them during use.

Although *tr* key bodies 285 preferredly are made of anti-friction polymer or all their rub surfaces coated therewith, it may be desired to specially weight the lower rear portions of said bodies to counter any tendency toward sticking in the up position, due to slight friction between rear spacer elements and their guides.

It is to be noted particularly, that just as in the case of levelizers 55 of the FIG. 12 embodiment, the rearwardmost portions of the levelizing members of the FIG. 32 embodiment, i.e., the "handles" 292 of equalizers 293 descend in use, in response to down motion of the *tr* keys respectively overlying them.

Lightness of weight of the overall assembly can be achieved in each type of situation, however, by suitable selection of structural materials, such as described elsewhere herein. And in the case of front stem 376 of the equalizers, materials having weight and strength properties akin to those of balsa wood are preferred.

Desirable properties for all materials to be used in the assemblies of the invention are: constancy of shape and dimension despite atmospheric differences, corrosion resistance, durability, and low cost.

Low density is not, generally speaking, a critical requirement for materials to be used for parts which are motionless-in-use, i.e. which do not move during playing.

For action parts properties additional to those above designated include: high strength-to-weight ratio, high resistance to deformation, and anti-friction.

A particularly advantageous material for use in frame parts, or in moving parts as well, is a product known as "Delrin"; it being currently obtainable from E. I. du Pont de Nemours and Co., of Wilmington, Delaware.

Referring again to the *tr*'s of FIGS. 1–10 and 12–24, it may be observed that the end arms of their shiftable frames may be omitted, and the lift-shift manipulation be done by using one or more of their keys as lifter keys; in which case the terminal *tr* key spacers (18 and 52) should be replaced by, or take the form of shiftable frame end pieces inter-uniting the tubes on which the *tr* keys are fulcrummed with the *tr* keys' lifter bars. By making such frame end pieces thin, so that they will occupy the locking furrows (27 in FIGS. 1–2) in the manner of end arms 9 and 10, and thus obviating need for such end arms, the number of *tr* keys can be proportionately increased, i.e. in situations where terminal space is at a premium.

In regard to the pivoting of the levelizers of said figures it may be remarked that a variety of types other than the ones above described can be used. E.g., merely looping fine copper wire or strong thread through eyes in the levelizer rears and adjacent guide channel walls will do. In fact, merely pressing a thumb tack through the channel walls so that it freely penetrates the eye of the levelizer will suffice; or providing the levelizer with transversely protruding lugs in place of an eye, said lugs being dimensioned so as to fit permanently in complementary transverse grooves in lower portions of the rears of the channel walls, e.g., after being squeezed into place in said grooves.

With further reference to FIG. 26 it may be noted that where support for the *tr* assembly is derived from the host keys collectively the terminal portions of the fixed frame or also of the shiftable frame can advantageously be made hollow, so as to minimize the load on terminal series of host keys.

Turning again to FIG. 29, it will be apparent that where support is derived from collective upforce of host ivories via seating of rearward frame structure on them at loci farther rearward than said center of gravity, the usual rearward sloping of host instrument ivories will inherently contribute stability against frontward displacement; as also will the normal rearward component of a player's finger force during use, where the assembly comprises playing keys of its own. In the latter case an overall length equal to at least three times the assembly's octave length will be a further stabilizing factor, especially when coupled with an overall weight amounting to at least one (better 1¼) ounce per $$\frac{\text{oct}}{12}$$

of said overall length.

It is to be borne in mind that the less the drop of a piano key ivory at its rear, the greater the finger force required for producing a given volume of tone, so that it is desirable that such drop approximate, as nearly as feasible, the drop at the front of the ivory. And even in the case of organs, where only the closing of an electrical circuit may be involved in the depressing of a key, the player will nevertheless customarily be used to a substantial degree of ivory drop, so that lack of it will represent an undesirable circumstance even in that case. Consequently, it may be stated generally that the drop of the rears of the ivories of the *tr* keys of the invention (i.e., in response to finger force applied on said rears) advantageously will be at least ⅕, better ¼, ⅓, ½, ⅔, or even equal to, that at their fronts (i.e., the drop in response to finger force applied on said fronts).

In ordinary pianos and organs a desired amount of drop at the rear of a key's ivory is achieved by fulcrumming the key a proportionate distance rearwardly thereof. And inspection of the location of pivot tubes 8 and 44a in instant FIGS. 3 and 12 will show that in each of said figures, and for the same reason, the drop at the rears of the ivories will exceed ¼ the drop at their fronts, while in FIG. 32 said fraction will in fact be ¼.

In the same connection, and bearing in mind the objective of minimizing arcing of the *tr* keys and levelizers associated with them, as well as rub and wear of key action parts and the further objective of imparting improved ivory motion to the *tr* keys, it will be noted that all portions of the keys-levelizing members directly underlying the *tr* ivories in FIGS. 3, 12 and 32 descend in use (cf. levelizers 15 and 55 in FIGS. 3 and 12, and "handles" 292 in FIG. 32); also that even the rearwardmost portions of said keys-levelizing members will descend in use in the cases of said levelizers 55 and, as already mentioned hereinabove, said "handles" 292. As regards the levelizers generally, said action is due to rearwardness of pivoting (of 15) or anchoring (of 55), and is aided by the rotative freeness at the pivots of 15 and the down movement freeness at the anchors of 55; said pivots and anchors advantageously being at the low elevations shown.

As set forth above, "ivory" means "the upwardly facing finger-contacting surface of a key, whether or not supplied by a lamina." In other words, use of the word "ivory" in the appended claims means the upwardly facing surface of a key, insofar as exposed for being contacted by the finger tips of a player during use. By the same token, "ivory length" means the length of said surface as measured from its front directly rearward to its rear.

When expressions such as "chromatic series of keys," "chromatic series of tone actuators," "keys in chromatic sequence," "chromatic series of piano-type ivories," or the like appear in the appended claims, they are to be interpreted as connoting the presence, during use, of sounders disposed in semi-tone succession so as to sound the chromatic scale when said "keys" or "ivories" are successively depressed by a player during use, or, in case said "tone actuators" have no finger-contacting surfaces themselves (as e.g. in the case of levelizers 55 of FIG. 12), when they are brought into operation by a player thus depressing said keys or ivories. Likewise, expressions such as "transposing device," "keyboard type musical instrument," or "keyboard instrument" are to be interpreted as implying the presence, during use, of such sounders, as well as keys and/or other tone actuators operable by a player to similarly cause said sounders to sound the chromatic scale. This is because the instant invention is addressed to automatic tonal transposition of piano and organ music as a general thing, i.e. to effect faithful reproduction of such music in a selected register other than that of the signature key.

Novel subject matter disclosed but not claimed herein is being claimed in continuational applications Ser. Nos. 238,339, filed Nov. 19, 1962, and 392,187, filed August 26, 1964.

Reference in the appended claims to "the plane which includes the white ivories" will generally designate, of course, a plane which includes the full area of the ivory, since the entire ivory area of usual piano and organ type white keys is flat so is included in a single plane. But should the white key in a particular case happen to be of the unusual sort wherein the wide front portion makes an upward or downward angle with the narrow rearward portion, said "plane" would be regarded as the one which includes the flat part of said ivory that begins in, and extends rearwardly from, the line which is tangent to the fronts of the black ivory caps at their base. Insofar as applicant can recall, all piano and organ type white keys, of any sort, have flat parts such as thus designated; so that use of them to determine said "plane" will be free from difficulty in any case.

It will be apparent that many changes in the physical embodiments of the invention and its novel aspects may be made within the scope of the appended claims without departing from the spirit of the invention.

I claim:

1. In combination with a keyboard type musical instrument comprising a piano type manual, a transposing device comprising a portable assembly overlying said manual, said assembly comprising a stationary frame carrying a chromatic series of tone actuators and having a bass-end portion, a treble-end portion, and an intermediate portion therebetween, said intermediate portion having a downwardly extending partition in close but free juxtaposition to a side surface of a key of said manual; at least twelve of said tone actuators being carried in said bass-end portion, at least twelve others of said tone actuators being carried in said treble-end portion, and additional said tone actuators being carried in said intermediate portion; said downwardly extending partition serving, in cooperation with said side surface, to prevent endward displacement of said stationary frame during use.

2. The transposing device of claim 1 wherein said stationary frame rests upon and receives support from rearward portions of white ivories of said manual, each of said white ivories being depressible during use.

3. A transposing device for use on a piano type keyboard having a longitudinal axis, said device consisting of an assembly comprising a stationary frame and a shiftable frame; the center of gravity of said assembly when in position of use on said keyboard being located rearwardly of the vertical plane which is parallel to said longitudinal axis of said keyboard and includes the frontmost frame structure comprised in said assembly, at least ⅔ the distance from said vertical plane to the vertical plane which includes the rears of the black ivories of said keyboard.

4. A transposer assembly comprising sounders disposed in semi-tone succession and a piano type manual having at least thirteen ivory-capped keys, said manual being transpositionally shiftable relative to said sounders, and having a stop rail which during use rests freely on and receives support from surfaces of said keys; said keys being disposed to move downwardly out of contact with said stop rail on depression of said keys during use, and to rise into re-contact therewith on return movement of said keys.

5. The transposer assembly of claim 4 wherein said stop rail is disposed rearwardly of the fronts of the black ivory caps of said keys and has a treble half and a bass half, in each of which halves the center of gravity is located more than half the distance from the midpoint of said stop rail to the respective outer ends of said halves;

the keys-stopping force of endward portions of said stop rail, in respect to keys directly underlying said endward portions, being thereby enhanced.

6. The transposer assembly of claim 5 wherein said stop rail carries $$\frac{oct}{12}$$

spacers.

7. The transposer assembly of claim 5 wherein a terminal portion of said stop rail carries locking means disposed for precluding endward displacement of said manual during use.

8. In combination with a keyboard type musical instrument comprising a piano type manual, a portable assembly overlying said manual and comprising a frame holding a plurality of levelizers which are supported by white ivories of said manual; said assembly also comprising a transpositionally shiftable frame holding a plurality of piano type keys which overlie and receive support from said levelizers; essentially the sole support of said portable assembly being the collective key-return forces of keys of said manual.

9. The combination of claim 8 wherein said first mentioned frame is supported solely by white keys of said manual.

10. The combinaton of claim 8 wherein endward displacement of said assembly is precluded by close juxtaposition of a portion of said first mentioned frame with a side surface of a key of said manual.

11. The combination of claim 10 wherein said side surface is that of a black key of said manual.

12. A transposing device for a keyboard type musical instrument comprising
(a) a first frame and a plurality of elongate keys-levelizing members associated therewith, extending frontwardly therefrom in approximately horizontal disposition, and having frontward upper surfaces disposed at a common elevation,
(b) a second frame and a chromatic series of piano type keys associated therewith, said keys having downpusher portions for contacting said surfaces to depress said members during use, said second frame and said series being transpositionally shiftable as a unit along said first frame,
(c) said series having white ivories whose rears are disposed to descend at least ⅕ as much as their fronts during use,
(d) means for holding said keys-levelizing members adjacent to said first frame in mutually parallel co-alinement and against sideward displacement,
(e) the rearwardmost portions of said keys-levelizing members being disposed to descend in response to down movement of $tr$ keys overlying said members.

13. The transposing device of claim 12 wherein the rears of said ivories are disposed to descend at least ¼ as much as their fronts during use.

14. The device of claim 12 wherein
(f) said plurality are levelizers.

15. The device of claim 12 wherein
(g) the under surface of each of said series comprises a first downpusher portion and a second downpusher portion, said first and second downpusher portions lying in a common plane which is parallel to the plane which includes the white ivories of said series,
(h) said second downpusher portion being at least ½″ rearward of said first downpusher portion, as measured in said common plane.

16. The device of claim 14 wherein
(i) said levelizers are held to said first frame at a locus below said common plane.

17. The device of claim 15 wherein
(j) said second downpusher portion is at least 1 and ⅛″ rearward of said first downpusher portion, as measured in said common plane.

18. A levelizer assembly adapted for use as the non-shiftable portion of a portable transposing device, said assembly comprising
(a) an elongate bar having downwardly extending partitions whose bottoms lie in a common plane,
(b) said partitions forming arches at least ⁷⁄₁₆″ in height in said bar to thereby roof over black ivories of a piano type keyboard when said bar is positioned for use on such keyboard with said bottoms resting on rearward portions of white ivories thereof,
(c) a plurality of approximately horizontally disposed frontwardly extending levelizers,
(d) anchor means holding rearward portions of said levelizers in juxtaposition to said partitions, and
(e) guide means guarding said levelizers against sideward displacement.

19. The assembly of claim 18 wherein
(f) end portions of said bar carry upwardly extending members for supporting at least one longitudinally extending frame member in overlying position above said bar.

20. The assembly of claim 18 wherein the rearwardmost portions of said levelizers are disposed to descend in use.

21. The assembly of claim 18 wherein
(g) said end portions respectively extend more than an $$\frac{oct}{12}$$

endwardly beyond the terminal ones of said plurality, and
(h) the under surfaces of said end portions lie in a plane which is higher than said first mentioned common plane,
(i) clearance of underlying host structure by said end portions in position of use being thereby facilitated.

22. In a transposing device for a keyboard type musical instrument
(a) piano type white and black $tr$ keys having upwardly extending tail portions,
(b) said portions having surfaces disposed at a common elevation above the plane which includes the white ivories of said keys,
(c) an elongate member overlying rearward portions of said keys and disposed for being moved into contact with said surfaces to thereby lift said keys as a unit.

23. A transposing device for a keyboard type musical instrument comprising
(a) a transpositionally shiftable frame and a chromatic series of piano type keys carried as a unit by said frame,
(b) a longitudinally extending member supported by upwardly facing surfaces of said keys which surfaces are located more rearwardly than the fronts of the black keys of said series,
(c) said surfaces lying in a common elevation below the plane which includes the white ivories of said keys,
(d) said longitudinally extending member being disposed to serve as an up-stop rail for said keys during use,
(e) said longitudinally extending member carrying locking means and being liftable by raising at least one of said keys, the lifting in such case being independently of the others of said keys, and
(f) a stationary frame having lock means thereon complementary to said locking means, raising of said longitudinally extending member serving to disengage said locking means from said lock means, and lowering of said longitudinally extending member serving to effect locking engagement between said locking means and said lock means.

24. In a transposing device for a keyboard type musical instrument having a chromatic series of piano type *tr* keys,
 (a) a frame and a plurality of levelizers respectively associated with said series and extending frontwardly from said frame in approximately horizontal disposition,
 (b) portions of said levelizers having frontwardly facing surfaces,
 (c) said frame comprising motionless-in-use anchor means presenting rearwardly facing surfaces disposed for being slidably engaged by said frontwardly facing surfaces during use, to prevent frontward displacement of said levelizers,
 (d) said frontwardly facing surfaces being disposed to move downwardly in response to down motion of *tr* keys associated with said levelizers.

References Cited by the Examiner

UNITED STATES PATENTS

| | | | |
|---|---|---|---|
| 297,222 | 4/84 | Bohrer | 84—446 |
| 904,730 | 11/08 | Scurfield | 84—446 |
| 1,004,350 | 9/11 | Bialik | 84—446 |
| 1,107,783 | 8/14 | Goss | 84—446 |
| 1,199,367 | 9/16 | Fromm | 84—447 |
| 1,657,169 | 1/28 | Mayhew | 84—425 |
| 2,505,608 | 4/50 | Edwards | 84—470 |
| 2,562,670 | 7/51 | Koehl | 84—423 X |

LEO SMILOW, *Primary Examiner.*

ARNOLD RUEGG, *Examiner.*